(12) United States Patent
Ellis

(10) Patent No.: US 7,531,118 B2
(45) Date of Patent: May 12, 2009

(54) HEAT FORMED TPV CO-EXTRUDED HEADER TRIM

(75) Inventor: Peter John Ellis, Rochester Hills, MI (US)

(73) Assignee: Decoma International, Inc., Concord, Ontario (CA)

( * ) Notice: Subject to any disclaimer, the term of this patent is extended or adjusted under 35 U.S.C. 154(b) by 766 days.

(21) Appl. No.: 10/967,924

(22) Filed: Oct. 18, 2004

(65) Prior Publication Data

US 2006/0080824 A1    Apr. 20, 2006

(51) Int. Cl.
*B29C 47/02* (2006.01)
*B29C 53/02* (2006.01)

(52) U.S. Cl. ............. 264/157; 264/171.15; 264/171.17; 264/171.24; 264/210.2

(58) Field of Classification Search ................. 264/157, 264/171.15, 171.17, 171.24, 210.2
See application file for complete search history.

(56) References Cited

U.S. PATENT DOCUMENTS

| | | | |
|---|---|---|---|
| 5,037,681 A * | 8/1991 | Yada et al. ................... | 428/31 |
| 5,056,850 A | 10/1991 | Katcherian et al. | |
| 5,112,101 A | 5/1992 | Katcherian et al. | |
| 5,248,179 A | 9/1993 | Biermacher et al. | |
| 5,350,211 A | 9/1994 | Yada et al. | |
| 5,424,023 A | 6/1995 | Riley et al. | |
| 5,628,150 A | 5/1997 | Mesnel | |
| 6,023,888 A | 2/2000 | Dover | |
| 6,189,198 B1 | 2/2001 | Keeney et al. | |
| 6,245,409 B1 | 6/2001 | Cook | |
| 6,370,824 B1 | 4/2002 | Keeney et al. | |
| 6,422,571 B1 | 7/2002 | Keeney et al. | |
| 6,487,820 B1 * | 12/2002 | Nakajima et al. .......... | 49/490.1 |
| 6,607,622 B2 * | 8/2003 | Lagrue et al. ................ | 156/108 |
| 2002/0108695 A1 | 8/2002 | Lagrue et al. | |

FOREIGN PATENT DOCUMENTS

| | | |
|---|---|---|
| EP | 0 386 986 A1 | 9/1990 |
| EP | 1 040 950 A1 | 10/2000 |
| EP | 1 155 806 A1 | 11/2001 |
| EP | 1 623 817 A1 | 2/2006 |

OTHER PUBLICATIONS

International Search Report and Written Opinion for PCT/US2005/037198 Dated Mar. 7, 2007.

* cited by examiner

*Primary Examiner*—James Mackey
(74) *Attorney, Agent, or Firm*—Clark Hill PLC

(57) ABSTRACT

A method is provided for manufacturing an upper reveal that conforms to a curved portion of a window opening of a motor vehicle door frame. The upper reveal is formed from TPV and a carrier. The method includes the steps of: co-extruding the TPV with the carrier; curing the TPV to form the upper reveal; heating the upper reveal to a temperature greater than a heat deformation temperature of the TPV; and bending the upper reveal to conform to the curved portion of the window opening of the motor vehicle door frame.

6 Claims, 8 Drawing Sheets

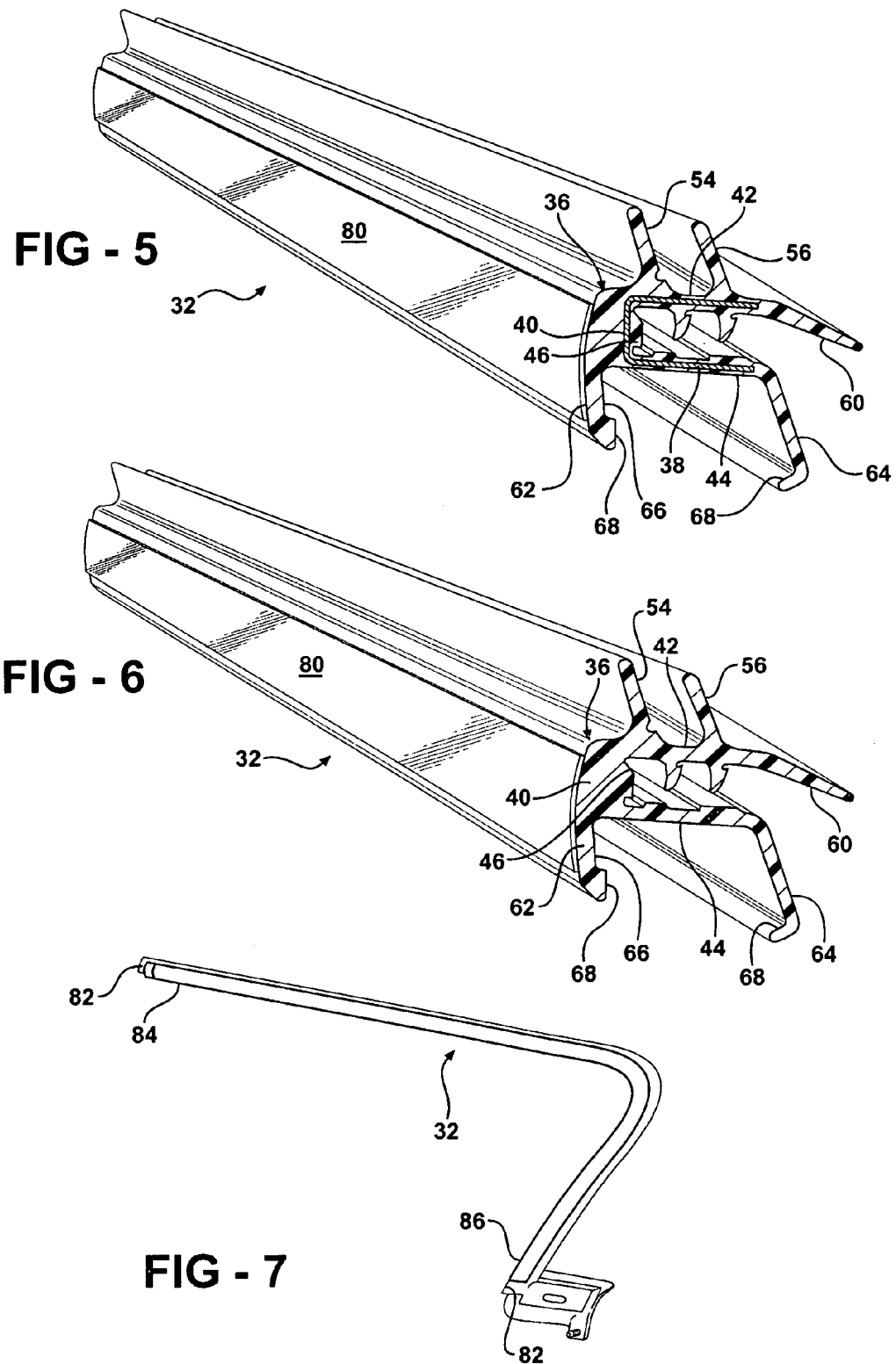

HEAT FORMED TPV CO-EXTRUDED HEADER TRIM

FIELD OF THE INVENTION

The invention relates to an upper reveal for a window opening of a motor vehicle door frame. More particularly, the invention relates to a method of manufacturing an upper reveal that conforms to the curvature of a window opening of a motor vehicle door frame.

DESCRIPTION OF RELATED ART

A door of a motor vehicle typically includes a door frame defining a window opening. A retractable window pane and a fixed window pane are disposed within the window opening. An upper reveal is typically secured to a header portion of the door frame and extends along the window opening. The upper reveal provides sealing engagement between the header and a body portion of the motor vehicle when the door is closed. At the same time, an outside surface of the upper reveal is disposed along the exterior of the door of the motor vehicle. Therefore, the upper reveal must have an aesthetically pleasing appearance.

In many motor vehicle doors, particularly rear doors, the window opening of the door frame has a curved portion or corner to complement the overall styling of the motor vehicle. As a result, the upper reveal must be able to be bent to conform to such curved portions or corners. Upper reveals generally include an outer layer, which is typically a thermoset material such as PVC or EPDM rubber, extruded onto a rolled metal carrier. The upper reveal is then stretch bent in order to conform to the curved or corner portion of the window opening. Bending the upper reveal tends, however, to adversely affect the upper reveal. More specifically, bending often results in appearance flaws such as crimping, creasing, bulging, buckling, or the like.

Upper reveals made up of two discrete pieces for conforming to the curvature of the window opening have been utilized to avoid the aforementioned appearance flaws. These upper reveals include a generally planar, extruded portion and a stamped metal portion having molded edges. The extruded portion fits along a generally planar portion of the window opening while the stamped metal portion conforms to the curvature of the corner or curved portion of the window opening. This configuration results, however, in an unattractive, visible joint at the spot where the mismatched extruded and stamped portions meet, thereby detracting from the overall appearance of the motor vehicle. In addition, the need for expensive tooling required to manufacture the stamped metal portion of the upper reveal is not cost-effective.

Thus, there remains a need for a cost-effective upper reveal that conforms to a corner or curved portion of a window opening and provides the door frame with an aesthetically pleasing appearance.

SUMMARY OF THE INVENTION

According to one aspect of the invention, a method is provided for manufacturing an upper reveal that conforms to a curved portion of a window opening of a motor vehicle door frame. The upper reveal is formed from TPV and a carrier. The method includes the steps of: co-extruding the TPV with the carrier; curing the TPV to form the upper reveal; heating the upper reveal to a temperature greater than a heat deformation temperature of the TPV; and bending the upper reveal to conform to the curved portion of the window opening of the motor vehicle door frame.

According to another aspect of the invention, a method for manufacturing an upper reveal, having a decorative trim, for a window opening of a motor vehicle door frame from a TPV material and a carrier includes the steps of: co-extruding the TPV with the carrier; curing the TPV to form the upper reveal; heating the upper reveal to a temperature greater than a heat deformation temperature of the TPV; bending the upper reveal to conform to the curved portion of the window opening of the motor vehicle door frame; and applying the decorative trim to the upper reveal.

According to still another aspect of the invention, a method for manufacturing an upper reveal, having opposing ends covered by end caps, for a window opening of a motor vehicle door frame from TPV and a carrier includes the steps of: co-extruding the TPV with the carrier; curing the TPV to form the upper reveal; and molding the end caps to the opposing ends of the upper reveal.

According to yet another aspect of the invention, a method for manufacturing an upper reveal from TPV of different durometer values for conforming to a curved portion of a window opening of a motor vehicle door frame includes the steps of: co-extruding the TPV of different durometer values, curing the TPV to form the upper reveal, heating the upper reveal to a temperature greater than a heat deformations temperature of the TPV; and bending the upper reveal to conform to the curved portion of the window opening of the door frame.

BRIEF DESCRIPTION OF THE DRAWINGS

Advantages of the present invention will be readily appreciated as the same becomes better understood by reference to the following detailed description when considered in connection with the accompanying drawings wherein:

FIG. 5 is a cut-away, perspective view of the upper reveal including a decorative trim applied thereto;

FIG. 6 is a cut-away, perspective view of the upper reveal including the molded strip of TPV without the carrier;

FIG. 7 is a cut-away, perspective view of a bent upper reveal including end caps molded thereto;

DETAILED DESCRIPTION OF THE PREFERRED EMBODIMENT

Figure 1:
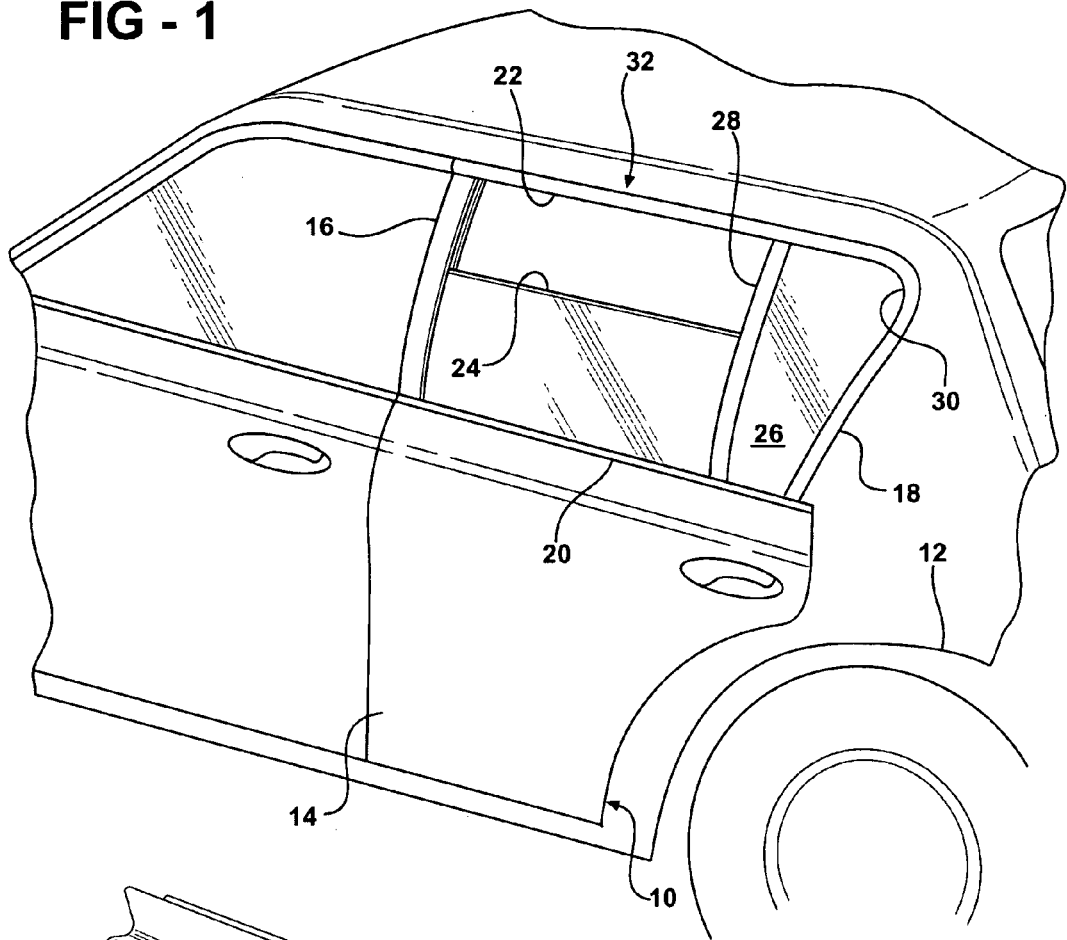
FIG. 1 is a fragmentary, perspective view of a motor vehicle including an upper reveal extending along a window opening of a door frame.

Referring to FIG. 1, a door, generally indicated at 10, for a motor vehicle 12 includes a door frame 14. Although it will be appreciated that the door 10 may be any of numerous motor vehicle doors, in an exemplary embodiment the door 10 is a rear door. The door frame 14 of the rear door 10 includes a B-pillar portion 16, a C-pillar portion 18, and a belt line 20. The belt line 20 extends longitudinally between the B-pillar portion 16 and the C-pillar portion 18.

The door frame 14 defines a window opening 22, the particular shape of which will vary depending upon vehicle styling considerations. A retractable window pane 24 selectively closes a portion of the window opening 22, and a fixed window pane 26 closes a remaining portion of the window opening 22. A division post 28 separates the retractable window pane 24 from the fixed window pane 26. The window opening 22 includes a curved portion 30 adjacent the C-pillar portion 18. The term "curved portion" is not intended to be narrowly construed. To this end, it is contemplated that the term "curved portion" encompasses any of numerous non-linear configurations, including a corner of the window opening 22.

An upper reveal, generally shown at 32, extends along the window opening 22 between the B-pillar portion 16 and the belt line 20 adjacent the C-pillar portion 18. Part of the upper reveal 32 is bent to conform to the curved portion 30 of the window opening 22. The upper reveal 32 is secured to a header flange 34, shown in FIG. 4, which extends out from an upper portion or header 35 of the door frame 14. Thus, the upper reveal 32 is disposed between the header 35 of the door frame 14 and each of the retractable 26 and fixed 28 window panes.

Figure 2:
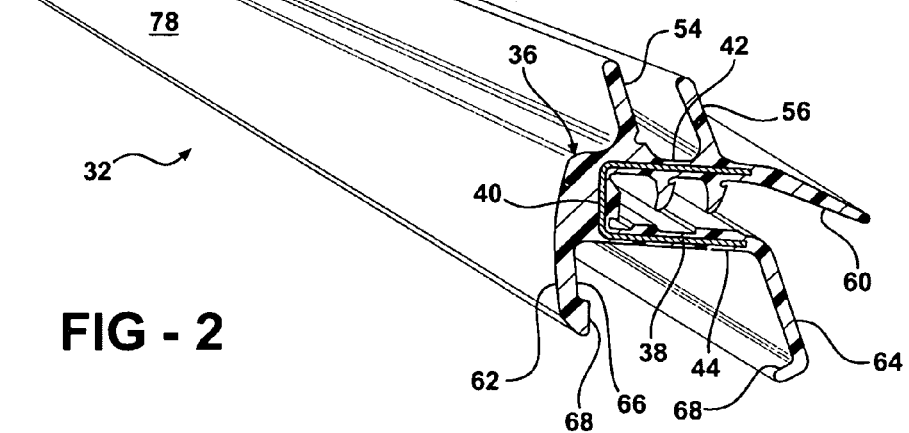
FIG. 2 is a cut-away perspective view of the upper reveal including a molded strip and a carrier.
Figure 3:
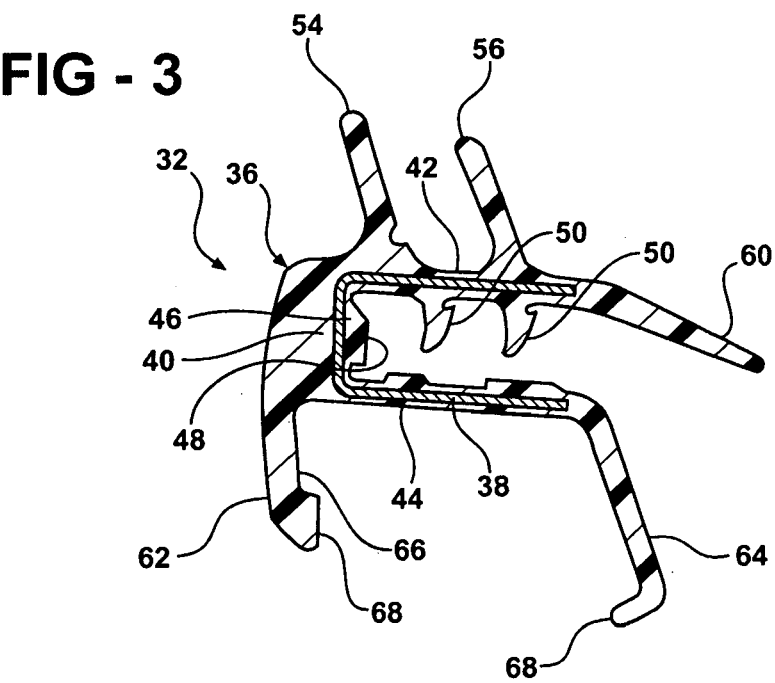
FIG. 3 is a cross-sectional view of the upper reveal.

Referring to FIGS. 2 and 3, the upper reveal 32 includes a molded strip, generally indicated at 36, and a carrier 38. In the preferred embodiment, the molded strip 36 is formed as an extruded member from TPV (thermoplastic vulcanisate) of different durometer values to meet varying flexibility and durability requirements. Specifically, the TPV is co-extruded with the carrier 38 so as to completely embed the carrier 38 within the molded strip 36. The upper reveal 32 is initially extruded as a generally linear piece, as shown in FIG. 2, which may be utilized for generally linear portions of the window opening 22.

Figure 4:
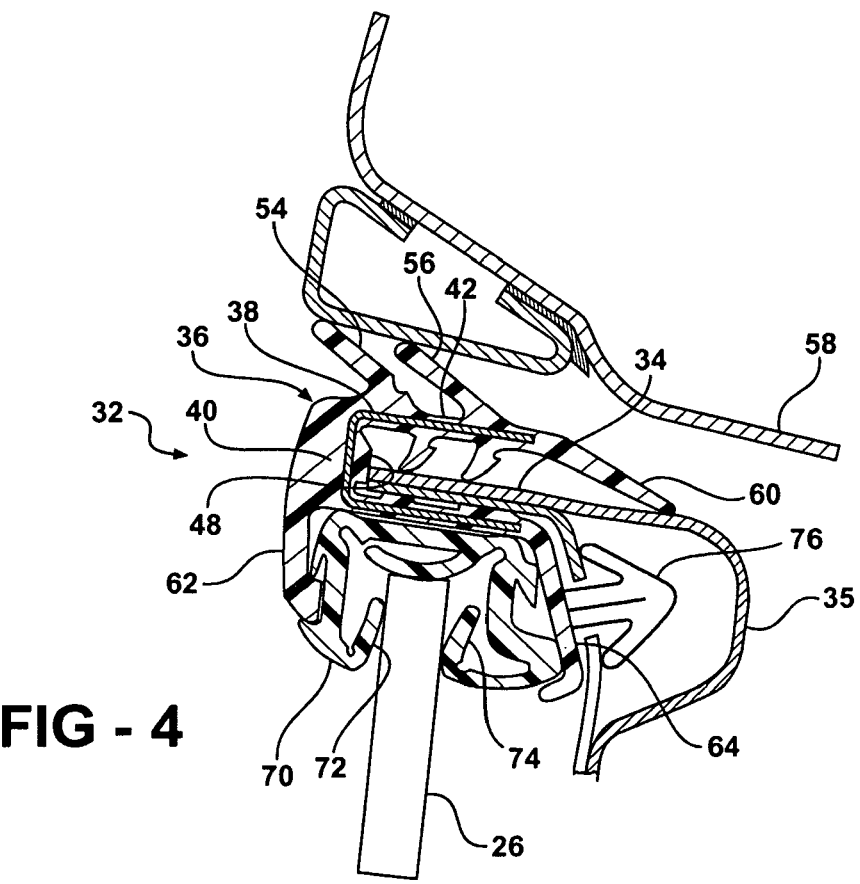
FIG. 4 is a cross-sectional view of the upper reveal secured to a header flange of the door frame.
Figure 8:
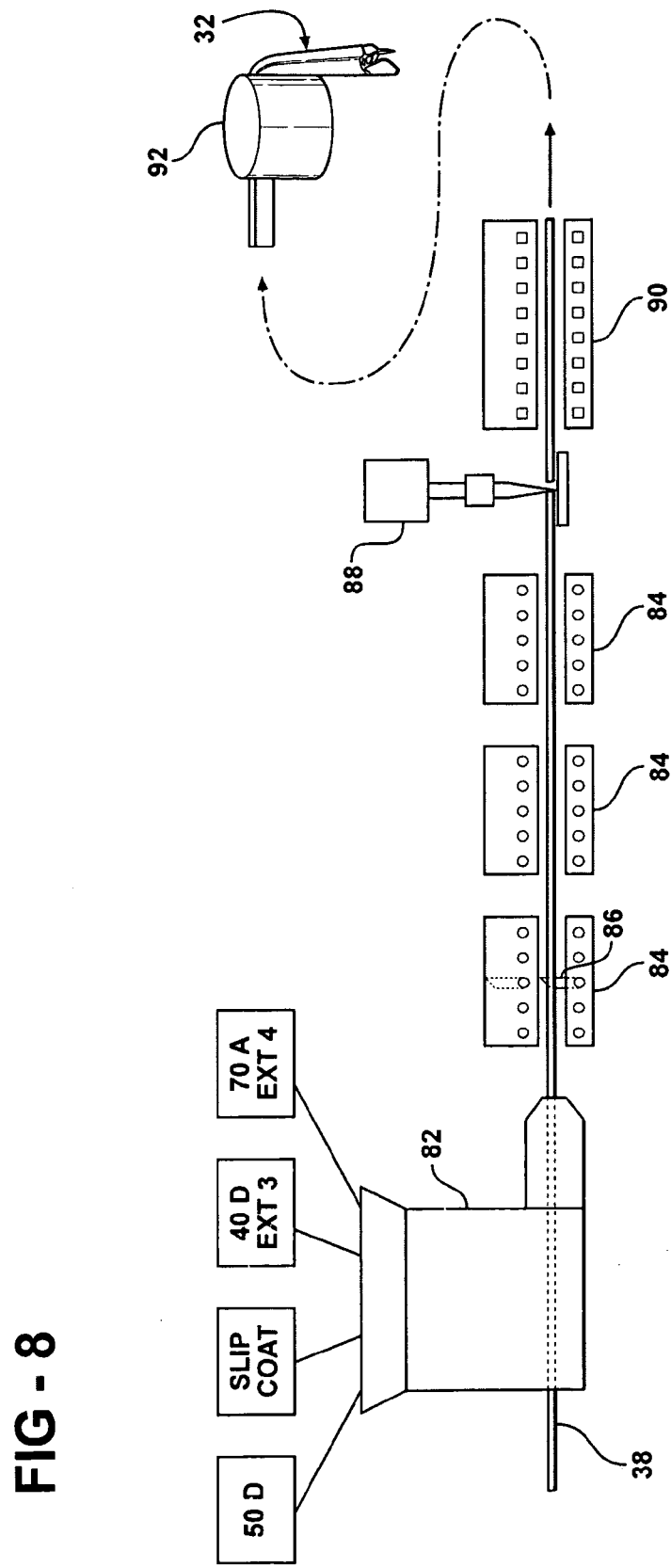
FIG. 8 is a schematic of a method of manufacturing the upper reveal according to one embodiment of the invention.

Referring to FIG. 3, the molded strip 36 includes a retention portion 40 having first 42 and second 44 segments, and a connecting segment 46 extending between the first 42 and second 44 segments. Preferably, the retention portion 40 has a durometer of approximately 40 Shore D. The first 42 and second 44 segments define an inner channel 48. A plurality of retention members 50 extends out from at least one of the first 42 and second 44 segments into the inner channel 48. The header flange 34, which extends along the upper portion 35 of the door frame 14 adjacent the window opening 22 (as shown in FIG. 4), is received within the inner channel 48. The plurality of retention members 50 frictionally engages the header flange 34 within the inner channel 48 to mount the upper reveal 32 along the window opening 22 of the door frame 14.

Referring again to FIGS. 2 and 3, the carrier 38 is generally U-shaped and is embedded within the retention portion 40 of the molded strip 36. More specifically, the carrier 38 is embedded within the first segment 42, the second segment 44, and the connecting segment 46 to provide rigidity to the upper reveal 32. The carrier 38 may initially have a fishbone or diamond configuration prior to conforming to the illustrated U-shape during extrusion. In the preferred embodiment, the carrier 38 is a roll formed metal, such as aluminum or steel. It is, however, contemplated that the carrier 38 could be molded from a thermoplastic material. The retention portion 40 may be formed with an air gap (not shown) adjacent the connecting segment 46 to prevent read-thru of metal as the TPV is co-extruded with the carrier 38.

Referring to FIGS. 3 and 4, the upper reveal 32 also includes a pair of spaced apart closeout lips 54, 56 extending out from the first segment 42 for concealing a portion of the frame 58. Each of the pair of spaced apart closeout lips 54, 56 has a durometer of approximately 75 Shore A. When the door 10 is closed, the pair of closeout lips 54, 56 sealingly engage the frame 58, as shown in FIG. 4.

Still referring to FIGS. 3 and 4, the upper reveal 32 further includes an interior sealing lip 60 extending out from the first segment 42 of the retention portion 40. The interior sealing lip 60 guides the header flange 34 into the inner channel 48 during attachment of the upper reveal 32 to the door frame 14. The interior sealing lip 60 also sealingly engages the header 35.

The retention portion 40 of the upper reveal 32 further includes spaced apart first 62 and second 64 legs extending out from the second segment 44. The first 62 and second 64 legs define an outer channel 66 therebetween. Each of the first 62 and second 64 legs includes an end portion 68 extending into the outer channel 66. Preferably, the first 62 and second 64 legs have a durometer of approximately 50 Shore D. A fastener 76, shown in FIG. 4, extends through the second leg 64 and a portion of the header 35 adjacent the header flange 34 to mount the upper reveal 32 to the door frame 14. It is appreciated that although only one fastener 76 is shown, a plurality of fasteners 76 is utilized to mount the upper reveal 32 along the entirety of the header flange 34.

Referring to FIG. 4, a glass run insert 70 is disposed within the outer channel 66 for receiving the retractable 26 and fixed 28 window panes thereagainst. The glass run insert 70 includes edge portions 72, 74 that contact the window panes 26, 28 within the outer channel 66 and provide sealing engagement between the window panes 26, 28 and the upper reveal 32. It is appreciated that although the glass run insert 70 has been disclosed as a discrete component that is snap fit into engagement with the upper reveal 32, the glass run insert 70 may, in the alternative, be integrally formed with the upper reveal 32.

Referring back to FIG. 3, the upper reveal 32 includes a reveal or "A" surface 78 extending along the molded strip 36. The reveal surface 78 is disposed along the exterior of the motor vehicle 12 when the upper reveal 32 is secured to the header flange 34. A decorative trim 80, shown in FIG. 5, may be applied along the reveal surface 78 to provide the upper reveal 32 with an aesthetically pleasing, finished exterior. More particularly, the decorative trim 80 has either a high gloss black finish, a low gloss black finish, a chrome finish, or is colored to match, complement, or contrast the appearance of the rest of the motor vehicle 12. The decorative trim 80 is preferably formed from thermoplastic polyolefin (TPO).

Referring to FIG. 6, the upper reveal 32 may be formed exclusively from TPV of different durometer values. Thus, in such an embodiment, the upper reveal 32 is formed without the carrier 38. Forming the upper reveal 32 exclusively from TPV results in an upper reveal 32 this is completely recyclable.

Referring to FIG. 7, ends caps 82 may be molded to opposing ends 84, 86 of the upper reveal 32, which has been bent to conform to the window opening (not shown). The end caps 82 effectively close out the ends 84, 86 of the upper reveal 32, which hides the otherwise rough, cut appearance of the ends 84, 86 of the upper reveal 32. The end caps 82 may be utilized with any of the variations of the upper reveal 32 described above.

Figure 9:
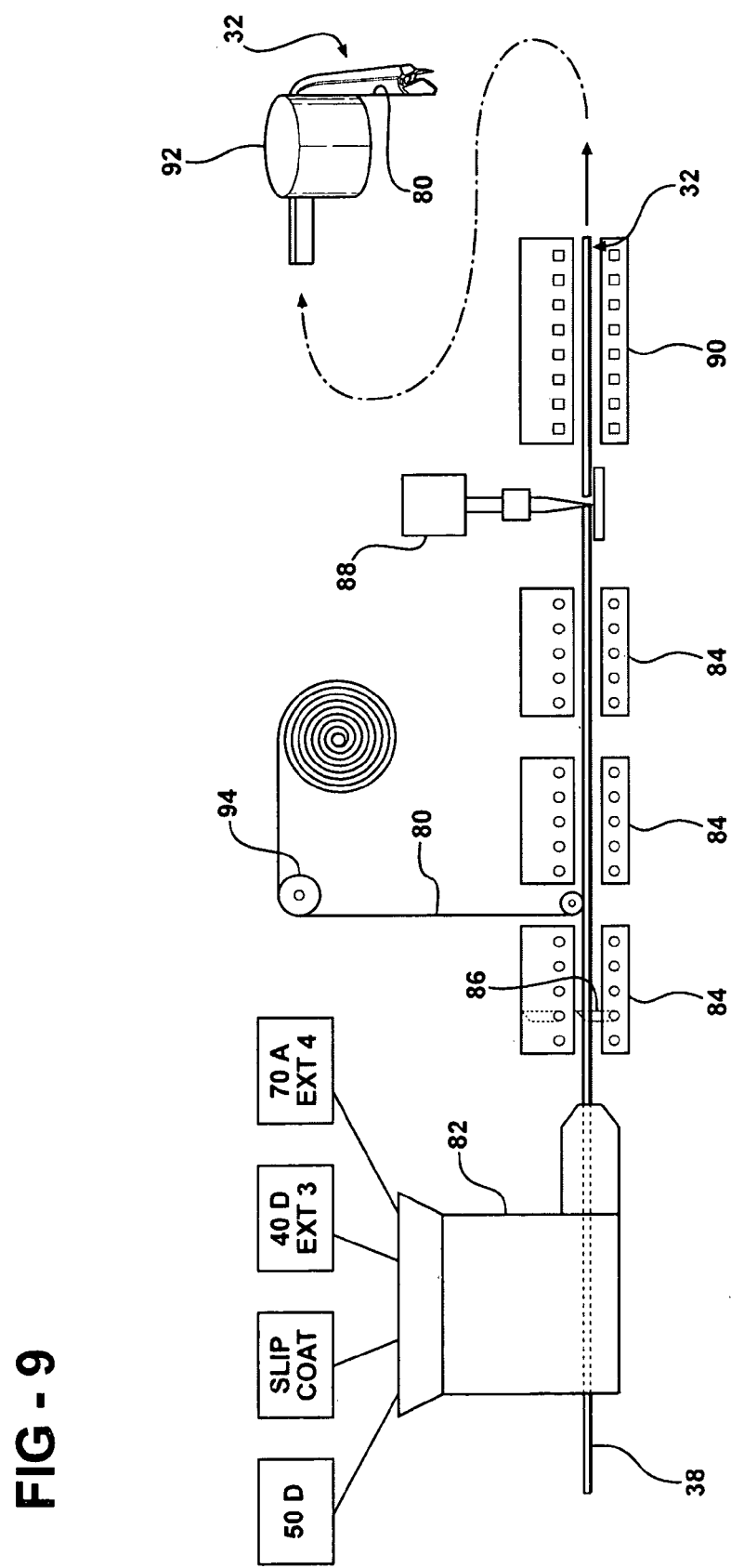
FIG. 9 is a schematic of a method of manufacturing the upper reveal according to another embodiment of the invention including the step of applying a decorative trim.

In one method of manufacturing the upper reveal 32 according to the invention, as shown in FIG. 9, the carrier 38 is first run through an extrusion die 82. The carrier 38 is either a roll formed metal or a molded thermoplastic component. The extrusion die 82 is also fed with TPV of different durometer values to co-extrude the molded strip 36 with the carrier 38 in order to form the generally linear upper reveal 32. During this co-extrusion step, the carrier 38 is completely embedded within the molded strip 36 of TPV. The upper reveal 32 is then passed through a series of cooling baths 84 in order to cure the TPV. The cooling bath 84 includes at least one sizing guide member 86 for maintaining the cross-section of the upper reveal 32 as the TPV is cured. The upper reveal 32 is then cut to a predetermined length by a cutter 88. Next, the upper reveal 32 is heated in an oven 90 to a temperature that is above a heat deformation temperature of the TPV. Preferably, the heat deformation temperature for TPV is a temperature between approximately 120° C. and 150° C. When the heat deformation temperature is reached, a bending press 92 is utilized for bending the upper reveal 32 to conform to the curved portion 30 of the window opening 22. Finally, the upper reveal 32 is secured to the header flange 34 extending along the header 35 of the door frame 14, as shown in FIG. 4.

Figure 10:
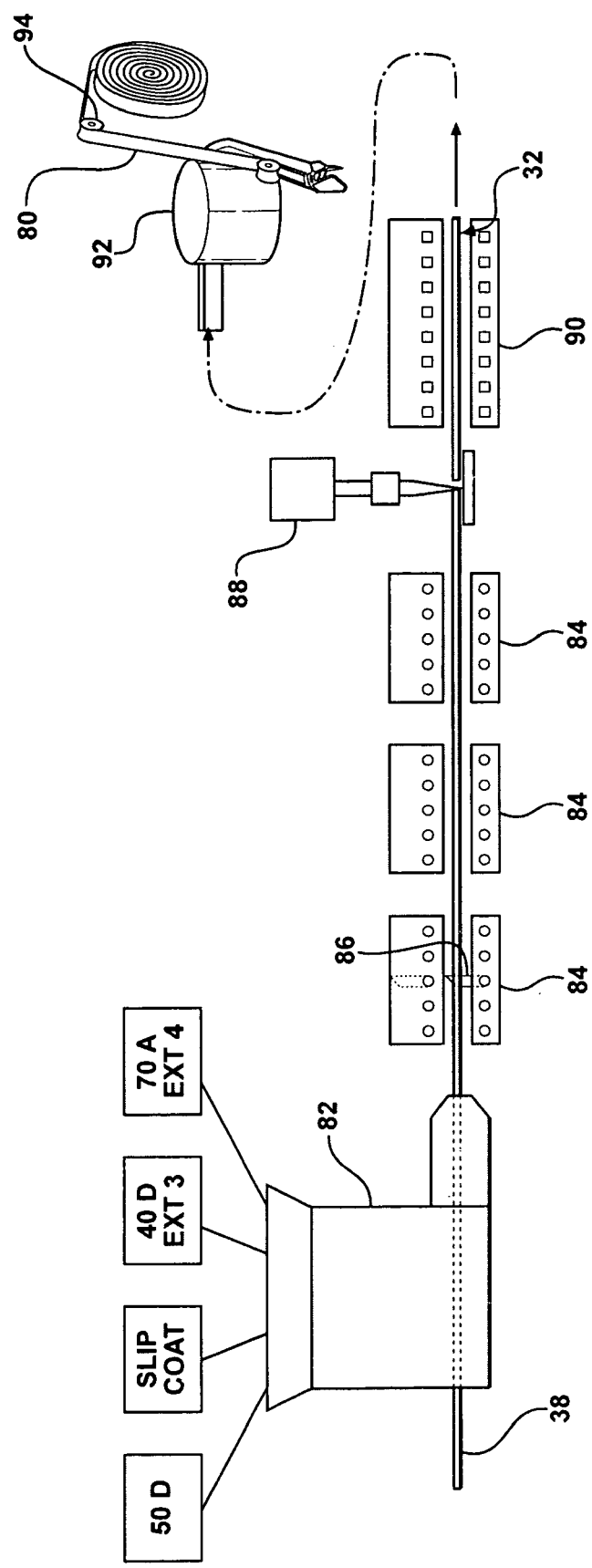
FIG. 10 is a schematic of a method of manufacturing the upper reveal similar to FIG. 9 wherein the step of applying the decorative trim is performed after the upper reveal has been bent.

In another method of manufacturing the upper reveal 32 according to the invention, shown in FIGS. 9 and 10, the carrier 38 is first run through the extrusion die 82. The carrier 38 is either a roll formed metal or a molded thermoplastic component. The extrusion die 82 is also fed with TPV of different durometer values to co-extrude the molded strip 36 with the carrier 38 in order to form the generally linear upper reveal 32. During this co-extrusion step, the carrier 38 is completely embedded within the molded strip 36 of TPV. The upper reveal 32 is then passed through a series of cooling baths 84 in order to cure the TPV. The series of cooling baths 84 include at least one sizing guide member 86 for maintaining the cross-section of the upper reveal 32 as the TPV is cured. As the TPV is being cured, the decorative trim 80 may be applied to the reveal surface 78 of the molded strip 36 by an applicator 94, as shown in FIG. 9. The upper reveal 32 is then cut to a predetermined length by a cutter 88. Next, the upper reveal 32 is heated in the oven 90 to a temperature that is above the heat deformation temperature of the TPV. Preferably, the heat deformation temperature for TPV is a temperature between approximately 120° C. and 150° C. When the heat deformation temperature is reached, the bending press 92 is utilized for bending the upper reveal 32 to conform to the curved portion 30 of the window opening 22. At this time, if the decorative trim 80 has not already been applied to the reveal surface 78 of the molded strip 36, the decorative trim 80 may now be applied to the reveal surface 78 by the applicator 94, as shown in FIG. 10. Finally, the upper reveal 32 is secured to the header flange 34 extending along the header 35 of the door frame 14, as shown in FIG. 4.

Figure 11:
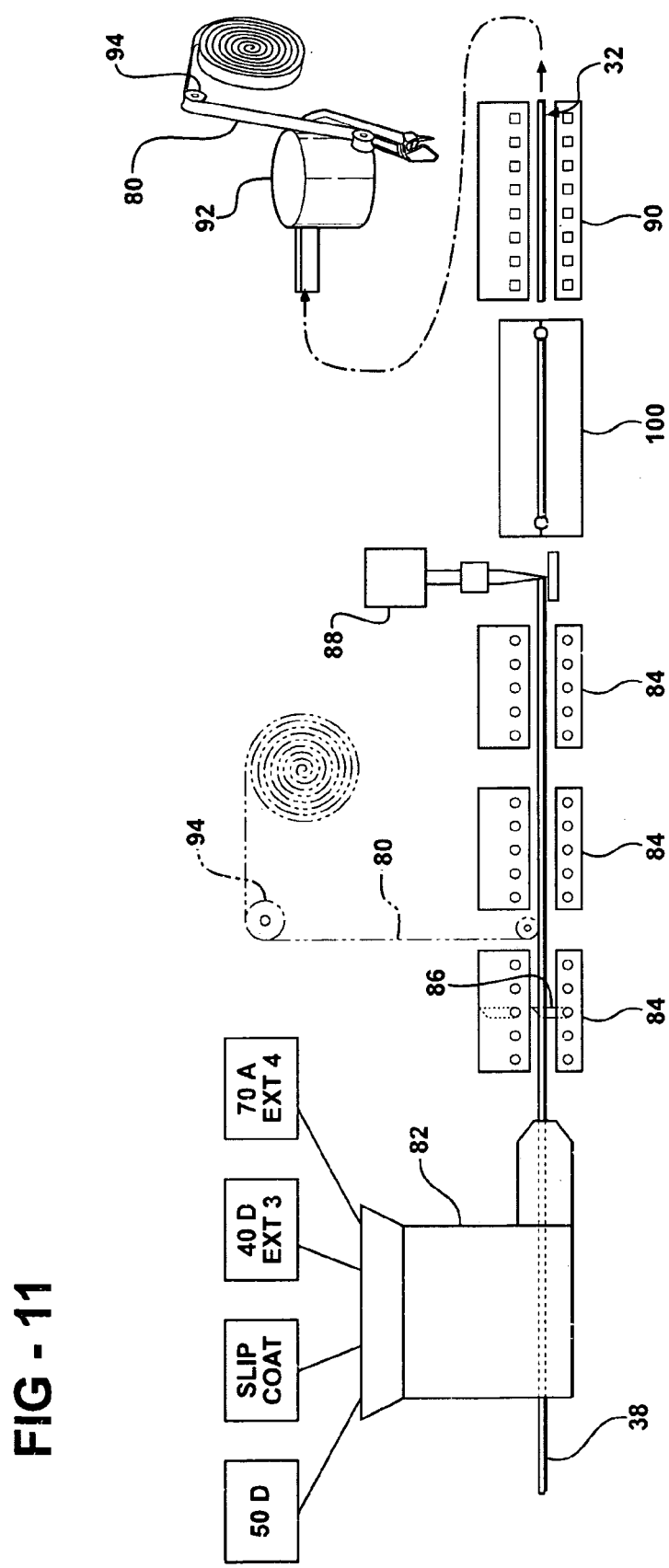
FIG. 11 is a schematic of a method of manufacturing the upper reveal according to still another embodiment of the invention.

In still another method of manufacturing the upper reveal 32 according to the invention, shown in FIG. 11, the carrier 38 is first run through the extrusion die 82. The carrier 38 is either a roll formed metal or a molded thermoplastic component. The extrusion die 82 is also fed with TPV of different durometer values to co-extrude the molded strip 36 with the carrier 38 in order to form the generally linear upper reveal 32. During this co-extrusion step, the carrier 38 is completely embedded within the molded strip 36 of TPV. The upper reveal 32 is then passed through a series of cooling baths 84 in order to cure the TPV. The series of cooling baths 84 include at least one sizing guide member 86 for maintaining the cross-section of the upper reveal 32 as the TPV is cured. The upper reveal 32 is then cut to a predetermined length by a cutter 88. Next, the upper reveal 32 is placed inside a mold 100, where the ends caps 82 are molded to the opposing ends 84, 86 of the upper reveal 32. If bending of the upper reveal 32 is desired in order to the conform the upper reveal 32 to the curved portion of the window opening, the upper reveal 32 is heated in the oven 90 to a temperature that is above the heat deformation temperature of the TPV. Preferably, the heat deformation temperature for TPV is a temperature between approximately 120° C. and 150° C. When the heat deformation temperature is reached, the bending press 92 is utilized for bending the upper reveal 32 to conform to the curved portion 30 of the window opening 22. The decorative trim 80 may be applied to the upper reveal 32 either as the TPV is being cured or after the upper reveal 32 has been bent to conform to the curved portion 30 of the window opening 22. Finally, the upper reveal 32 is secured to the header flange 34 extending along the header 35 of the door frame 14.

Figure 12:
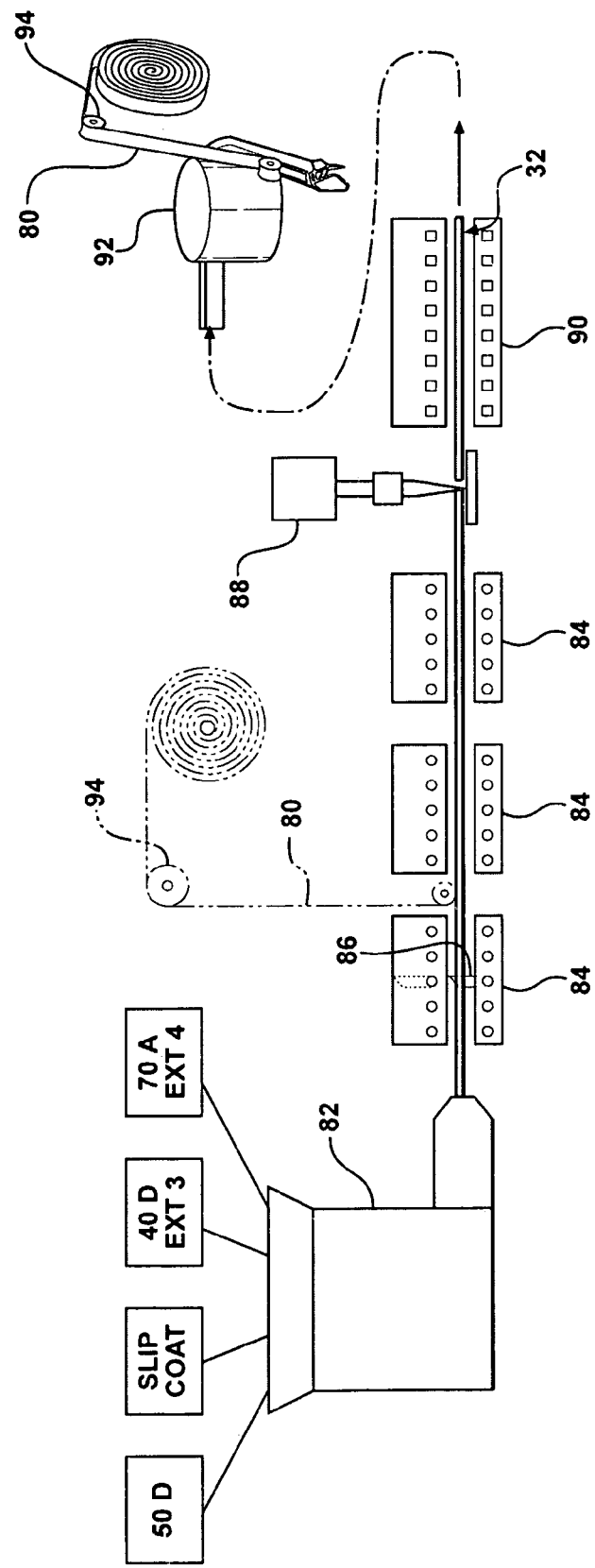
FIG. 12 is a schematic of a method of manufacturing the upper reveal according to yet another embodiment of the invention.

In yet another method of manufacturing the upper reveal 32 according to the invention, as shown in FIG. 12, TPV of different durometer values is fed into the extrusion die 82 to form the molded strip 36. The carrier 38 is not utilized in the current method. Thus, the upper reveal 32 includes the molded strip 36 of TPV of different durometer values. The upper reveal 32 is then passed through a series of cooling baths 84 in order to cure the TPV. The series of cooling baths 84 include at least one sizing guide member 86 for maintaining the cross-section of the upper reveal 32 as the TPV is cured. The upper reveal 32 is then cut to a predetermined length by a cutter 88. Next, the upper reveal 32 is heated in the oven 90 to a temperature that is above the heat deformation temperature of the TPV. Preferably, the heat deformation temperature for TPV is a temperature between approximately 120° C. and 150° C. When the heat deformation temperature is reached, a bending press 92 is utilized for bending the upper reveal 32 to conform to the curved portion 30 of the window opening 22. The decorative trim 80 may be applied to the upper reveal 32 either as the TPV is being cured or after the upper reveal 32 has been bent to conform to the curved portion 30 of the window opening 22. Finally, the upper reveal 32 is secured to the header flange 34 extending along the header 35 of the door frame 14.

The invention has been described in an illustrative manner. It is to be understood that the terminology, which has been used, is intended to be in the nature of words of description rather than of limitation. Many modifications and variations of the invention are possible in light of the above teachings. Therefore, within the scope of the appended claims, the invention may be practiced other than as specifically described.

What is claimed:
1. A method of manufacturing an upper reveal, having an exterior decorative trim, for conforming to a curved portion of a window opening of a motor vehicle door frame from TPV and a carrier, the method comprising the steps of:
    co-extruding the TPV with the carrier to form the upper reveal;
    curing the TPV to form the upper reveal;
    maintaining the cross-section of the upper reveal with a guide member simultaneous with the step of curing the TPV to form the upper reveal;
    heating the upper reveal to a temperature greater than a heat deformation temperature of the TPV;
    bending the upper reveal to conform to the curved portion of the window opening of the door frame; and
    applying the decorative trim to the upper reveal.
2. A method as set forth in claim 1 including the step of cutting the upper reveal to a predetermined length prior to the step of heating the upper reveal to a temperature greater than a heat deformation temperature of the TPV.

3. A method as set forth in claim 2 wherein the applying step is subsequent to the step of bending the upper reveal to conform to the curved portion of the window opening of the door frame.

4. A method as set forth in claim 2 wherein the applying step is simultaneous to the step of curing the TPV to form the upper reveal.

5. A method as set forth in claim 2 including the step of roll forming the carrier prior to the step of co-extruding the TPV with the carrier.

6. A method as set forth in claim 2 including the step of molding the carrier prior to the step of co-extruding the TPV with the carrier.

* * * * *